3,162,606
PREPARATION OF SUPPORTED NICKEL CATALYSTS
Albert P. Giraitis, Vello Norman, and Thomas P. Whaley, Baton Rouge, La., assignors to Ethyl Corporation, New York, N.Y., a corporation of Virginia
No Drawing. Filed Aug. 31, 1960, Ser. No. 53,027
10 Claims. (Cl. 252—466)

This invention relates to a method for the preparation of new and very useful nickel catalysts through a simple and economical process.

The size of a nickel catalyst is extremely important and can create major problems in conducting many catalytic processes in which it is used. For example, an effective nickel catalyst for fluidized bed operations requires high surface area, and accordingly the art has resorted to microspheroidal, or even colloidal nickel catalyst for this purpose. However, separation of such prior catalysts from the product is very difficult since they are so minute as to become suspended in the product during processing. Thus there is a distinct need for an effective, commercial nickel catalyst having an optimum surface area in combination with a size which will facilitate the separation of the product from the spent catalyst during operation. Achieving such an objective in an unprecedented and economical manner is a significant feature of this invention.

Therefore, it is an object of this invention to provide a novel, simple and economical process for the preparation of excellent nickel catalysts. It is another object of this invention to provide a process which conveniently produces a nickel catalyst of exceptionally high catalytic activity, and which exhibits an optimum combination of surface area and size. A further object is the provision of a process for preparing these nickel catalysts by the decomposition of a particular type of organonickel compound and the deposition therefrom of an adherent nickel containing plate on an inert support. The preparation of nickel-containing catalysts by the thermal decomposition of a uniquely effective class of organonickel compounds is another object of this invention. These and other objects shall appear more fully hereinafter.

Excellent nickel catalysts are produced when a nickel containing deposit is plated on a substrate by a process which comprises the decomposition of a cyclopentadienyl nickel nitrosyl compound in contact with an inert substrate (i.e., stable under the processing conditions employed) having a surface area of about 0.5 square meter per gram up to about 500 square meters per gram. When a cyclopentadienyl nickel nitrosyl compound is decomposed in contact with an inert substrate having a surface area of about 8 square meters per gram to about 140 square meters per gram, there is produced a highly effective nickel catalyst which is an optimum combination of surface area and particle size thus facilitating convenient separation of product from spent catalyst during operation of catalytic processes for which such catalyst is ideally suited.

Nickel catalysts of what is believed to be unprecedented catalytic activity—even surpassing that of Raney nickel, colloidal nickel, colloidal copper and colloidal cobalt—are produced by thermal decomposition of cyclopentadienyl nickel nitrosyl in contact with an inert substrate having a surface area of about 0.5 square meter per gram up to about 500 square meters per gram. This novel nickel-containing catalyst contains a green outer deposit when decomposition temperatures of 200–275° C. are employed, and a black outer deposit when higher temperatures than 200–275° C. are utilized. On a weight basis, the total nickel content of this novel nickel-containing catalyst ranges from about 5 to about 21 percent and generally ranges from about 5 to about 8 percent.

A specific embodiment of this invention is a process for the preparation of a nickel-containing catalyst by deposition of a nickel containing coat upon a substrate, which comprises the thermal decomposition of cyclopentadienyl nickel nitrosyl in contact with an alumina substrate which can be adsorption alumina, activated alumina or alumina pellets, such forms of alumina being readily available as articles of commerce. Particularly convenient are an 80–200 mesh adsorption alumina, 8–14 mesh activated alumina and about 3–7 mesh alumina pellets. (Mesh sizes determined according to standard ASTM methods.)

By decomposition as used herein is meant any method for decomposing a cyclopentadienyl nickel nitrosyl compound. Thus the term includes ultrasonic and ultraviolet decomposition as well as thermal decomposition. However thermal decomposition is preferred and therefore within the scope of this invention is a process for the preparation of a nickel-containing catalyst by plating an inert substrate with a nickel-containing deposit which comprises heating the substrate to be plated to a temperature above the decomposition temperature of a cyclopentadienyl nickel nitrosyl compound and thereafter contacting said compound with said substrate.

Examples of the cyclopentadienyl nickel nitrosyl compounds used in this invention are cyclopentadienyl nickel nitrosyl, methylcyclopentadienyl nickel nitrosyl, and the like. The cyclopentadienyl substituent of these compounds can be a substituted cyclopentadienyl group and as such includes alkyl and aryl substituents, but generally contains no more than about 17 carbon atoms. The cyclopentadienyl moiety is preferably a hydrocarbon cyclopentadienyl group containing from 5 to about 12 carbon atoms.

In general any prior art technique for metal plating an object by thermal decomposition of a metal-containing compound can be employed in the present plating process as long as a cyclopentadienyl nickel nitrosyl compound is employed as the plating agent (i.e., metallic source for the metal plate). For example, any technique heretofore known for the thermal decomposition and subsequent plating of metals from the corresponding metal carbonyl can be employed. Illustrative are those techniques described by Lander and Germer, American Institute of Mining and Metallurgical Engineers, Tech. Pub. No. 2259 (1947). Usually the technique to be employed comprises heating the object to be plated to a temperature above the decomposition temperature of the plating agent and thereafter contacting the plating agent with the heated object. The following examples are more fully illustrative of the process of this invention.

In Examples I–V the following technique was used:

Into a conventional heating chamber housed in a resistance furnace and provided with means for gas inlet and outlet is placed the object to be plated. The plating agent is placed in a standard vaporization chamber provided with heating means, said vaporization chamber being connected by an outlet port to the aforesaid combustion chamber inlet means. For the plating operation the object to be plated is heated to a temperature above the decomposition temperature of the cyclopentadienyl nickel nitrosyl plating agent, the system is evacuated and the plating agent is heated to an appropriate temperature where it possesses vapor pressure of up to about 10 millimeters. In most instances the process is conducted at no lower than 0.01 millimeter pressure. The cyclopentadienyl nickel nitrosyl compound vapors are pulled through the system as the vacuum pump operates and impinge on the heated object decomposing and forming the nickel-containing coat. In most instances no carrier gas is employed. However, in certain cases, a carrier gas can be employed to increase the efficiency of the above disclosed plating system. In those cases where a carrier gas is employed a system such as described by Lander and Germer, supra, page 7, is utilized. In Examples I-V alumina substrates are employed. These alumina substrates possess an apparent surface area ranging from 1-140 square meters per gram; however, for convenience, have been described according to their commercial designations, which are in terms of mesh size.

*Example I*

Compound: Cyclopentadienyl nickel nitrosyl.
Compound temp.: 40° C.
Substrate: 80-200 mesh adsorption $Al_2O_3$ (140 square meters per gm.).
Substrate temp.: 300° C.
Pressure: 2 mm.
Time: 2 hours.
Result: Black deposit.

*Example II*

Compound: Cyclopentadienyl nickel nitrosyl.
Compound temp.: 50° C.
Substrate: 6-7 mesh $Al_2O_3$ pellets (1 square meter per gm.).
Substrate temp.: 310° C.
Pressure: 2 mm.
Time: 1 hour.
Result: Black deposit.

*Example III*

Compound: Methylcyclopentadienyl nickel nitrosyl.
Compound temp.: 30° C.
Substrate: 80-200 mesh adsorption $Al_2O_3$ (140 square meters per gm.).
Substrate temp.: 300° C.
Pressure: 1 mm.
Time: 1 hour.
Result: Black deposit.

*Example IV*

Compound: Indenyl nickel nitrosyl.
Compound temp.: 50° C.
Substrate: 3-4 mesh $Al_2O_3$ pellets (85 square meters per gm.).
Substrate temp.: 300° C.
Pressure: 2 mm.
Time: 1 hour.
Result: Black deposit.

*Example V*

Compound: Cyclopentadienyl nickel nitrosyl.
Compound temp.: 25° C.
Substrate: 8-14 mesh activated $Al_2O_3$.
Substrate temp.: 250° C.
Pressure: 1 mm.
Time: 2 hours.
Result: Green deposit.

In general the total nickel content of the nickel-containing catalyst of this invention is found to be between about 5-8 percent (i.e., total nickel content in deposit and substrate). Higher nickel content can easily be produced by increasing the length of time the deposition is carried out. However excellent nickel catalysts were produced with a nickel content of no higher than 21 percent and thus it is felt that higher nickel content, although feasible, would unduly increase the cost of the catalyst.

In carrying out this invention decomposition temperatures ranging from 200-275° C. generally produce a green deposit upon the inert substrate employed. At higher temperatures the nickel-containing substance is deposited as a black, dull coating upon the inert substrate.

Examples I-V employed resistance heating. In the following example an induction heating method, using higher temperatures, is employed. In the latter process a black nickel-containing deposit upon the inert substrate is obtained. The process employed is essentially the same as that employed in Examples I-V with the exception that the object to be plated is placed into a conventional heating chamber provided with means for high frequency induction heating as opposed to the former process where the heating chamber was housed in a resistance furnace.

*Example VI*

Compound: Cyclopentadienyl nickel nitrosyl.
Compound temp.: 30° C.
Substrate: SiC (about 10 square meters per gm.).
Substrate temp.: 400° C.
Pressure: 1 mm.
Time: 1 hour.
Result: Black deposit.

In addition to the thermal techniques disclosed hereinabove other methods of decomposition of a cyclopentadienyl nickel nitrosyl plating agent can be employed. Thus the following working example illustrates decomposition by ultrasonic frequency.

The process employed in Examples I-V is followed with the exception that an ultrasonic generator is proximately positioned to the plating apparatus. In this example the compound is heated to its decomposition threshold and thereafter the ultrasonic generator is utilized to effect final decomposition.

*Example VII*

Compound: Cyclopentadienyl nickel, nitrosyl.
Compound temp.: 40° C.
Substrate: $SiO_2$ (about 5 square meters per gm.).
Substrate temp.: 350° C.
Time: 1 hour.
Result: Black deposit.

Another method for decomposing the plating agent of this invention is by decomposition with ultraviolet irradiation. The following example demonstrates this technique.

The method of Examples I-V is employed with the exception that in place of the resistance furnace there is utilized for heating a battery of ultraviolet and infrared lamps placed circumferentially around the outside of the heating chamber. The substrate to be heated is brought to a temperature just below the decomposition temperature of the plating agent with the infrared heating and thereafter decomposition is effected with ultraviolet rays.

*Example VIII*

Compound: Cyclopentadienyl nickel nitrosyl.
Compound temp.: 40° C.
Substrate: Diatomaceous earth (about 400 square meters per gm.).
Substrate temp.: 280° C.
Pressure: 1 mm.
Time: 1 hour.
Result: Grey-black deposit.

As has been stated above, the nickel-containing catalyst of this invention comprises a nickel containing coat deposited upon an inert substrate, i.e., a catalytic support which is substantially inert to the conditions under which the deposition of the nickel-containing coating is effected, and which furthermore exhibits a surface area ranging from about 0.5 square meter per gram up to about 500 square meters per gram. By "substantially inert" is meant that the catalytic support possesses sufficient structural strength under the conditions at which the deposition is effected so as to provide a suitable support for receipt of the nickel-containing deposit which is being plated thereon. Although in general any inert catalyst support exhibiting these characteristics can be employed in the process of this invention, the inert catalyst support should exhibit stability under the catalytic processing environment in which the catalyst is to be used. In this connection the most important characteristic for consideration is the heat stability of the inert support. The problem of chemical stability is obviated because the surface of the catalytic inert support is uniformly coated with an adherent nickel-containing deposit and thus is protected against chemical attack. Specific examples of inert substrates employed in the process of this invention are alumina—both adsorption and activated as well as pellet forms; silicon carbide, silicon dioxide, diatomaceous earth, carbon, graphite; ceramics, such as zirconium oxide and kieselguhr; mixed ceramics, such as zirconium oxide-calcium oxide, zirconium oxide-silicon oxide-aluminum oxide, silicon-aluminum oxide; heterogeneous substrates such as mixtures of ceramics and metals—commonly referred to as "cermets," e.g., nickel with lead silicate, chromium with aluminum silicate, tungsten with beryllium and aluminum oxide, molybdenum with calcium and aluminum oxide; other refractory substrates such as beryllium carbide, boron carbide, titanium carbide, vanadium nitride, niobium nitride, titanium silicide, nickel silicide and the like.

The nickel-containing coatings deposited on the inert substrates utilized herein exhibit extremely uniform coverage and excellent adherence. However, it should be noted that when employing the cyclopentadienyl nickel nitrosyl plating agents utilized in this invention it is preferred to maintain enough vapor pressure below the decomposition temperature of the plating agent to enable the process to be conducted at an appreciable rate of plating. Too high vapor pressure results in somewhat inferior substrate adherence. Thus it is preferred to employ up to about 10 mm. pressure during the plating operation—preferably 0.01 to 10 mm. pressure.

As has been pointed out above, temperatures above the decomposition temperature of the cyclopentadienyl nickel nitrosyl compound employed as the plating agent herein can in general be employed. This decomposition temperature varies with the cyclopentadienyl nickel nitrosyl compound chosen as the plating agent. The temperature generally never exceeds 600° C. and usually the process is conducted at a temperature below 500° C. Most of the cyclopentadienyl nickel nitrosyl compounds preferred in this invention decompose at a temperature of about 200–400° C. Lower temperatures, i.e., in the range of 200–275° C., generally give a green deposit upon the inert substrate and higher temperatures, i.e., above 300° C. give a black, dull coating. However, both of these nickel-containing deposits exhibit high catalytic activity.

The nickel-containing catalysts produced by the process of this invention find use in a multitude of catalytic applications. In general, these novel nickel catalysts can very effectively be used as replacements for known nickel catalysts, such as Raney nickel, in catalytic processes where these prior art nickel catalysts are now employed. For example, the novel nickel-containing catalysts of this invention are excellent catalysts for organic synthesis reactions such as hydrogenation and dehydrogenation. An example is the hydrogenation of vegetable oil in the presence of the nickel-containing catalysts produced by thermal decomposition of cyclopentadienyl nickel nitrosyl in contact with 80–200 mesh (i.e., an apparent surface area of 140 square meters per gram) adsorption alumina. These novel nickel-containing catalysts are also propitiously employed in olefin displacement reactions with organoaluminum compounds. Thus when the product produced by the reaction between triethyl-aluminum and propylene is reacted with ethylene in the presence of a nickel-containing catalyst of this invention, 2-methyl-1-butene is produced, which can then easily be dehydrogenated to isoprene. Experimental comparison of the effectiveness of the nickel-containing catalysts of this invention with that of such commercial nickel catalysts as Raney nickel and colloidal nickel has demonstrated the superior catalytic effectiveness of these novel nickel catalysts over that of the prior art nickel catalysts.

Having described this invention as set forth above it is not intended that the scope thereof be limited except as by the spirit and scope of the appended claims.

We claim:

1. A process for the preparation of a nickel catalyst which comprises heating alumina to a temperature of 300° C. at a pressure of 2 mm. of mercury and thereupon contacting cyclopentadienyl nickel nitrosyl with said alumina, said alumina having a surface area of about 140 square meters per gram.

2. A process for the preparation of a nickel catalyst which comprises heating a substrate having a surface area of from about 0.5 to about 500 parts square meters per gram which is stable under the conditions hereinafter defined to a temperature less than 600° C. but sufficient to thermally decompose a cyclopentadienyl nickel nitrosyl compound and effecting contact between said compound and the heated substrate at a pressure within the range of from about 0.01 to about 10 mm. of mercury.

3. The process of claim 2 further characterized in that said substrate is selected from the group consisting of aluminum oxides, silicon carbides, silicon oxides, and diatomaceous earth.

4. The process of claim 2 further characterized in that said substrate is alumina.

5. The process of claim 2 further characterized in that said susbtrate has a surface area within the range of from about 8 square meters per gram to about 140 square meters per gram.

6. The process of claim 2 further characterized in that said compound is a cyclopentadienyl nickel nitrosyl compound wherein said cyclopentadienyl group is a hydrocarbon group containing from 5 to about 12 carbon atoms.

7. The process of claim 2 further characterized in that said compound is cyclopentadienyl nickel nitrosyl.

8. The process of claim 2 further characterized in that said compound is methylcyclopentadienyl nickel nitrosyl.

9. The process of claim 2 further characterized in that said compound is indenyl nickel nitrosyl.

10. The process of claim 2 further characterized in that said substrate is heated to a temperature within the range of from about 200° C. to about 400° C. sufficient to thermally decompose said compound.

References Cited in the file of this patent

UNITED STATES PATENTS

| | | |
|---|---|---|
| 2,132,613 | Francon | Oct. 11, 1938 |
| 2,599,978 | Davis et al. | June 10, 1952 |
| 2,930,767 | Novak | Mar. 29, 1960 |
| 2,946,743 | Moy et al. | July 26, 1960 |

OTHER REFERENCES

Wilkinson et al.: "J. Am. Chem. Soc.," April 5, 1954, vol. 76, pages 1970–74.

"Chem. Abstracts," Sept.–Oct. 1956, vol. 50, No. 10, page 12036 pertinent.